J. B. ELLIOTT.
THRESHING MACHINE.
APPLICATION FILED JULY 29, 1916.

1,262,760.

Patented Apr. 16, 1918.
3 SHEETS—SHEET 1.

Inventor
J. B. Elliott.

Witness
Attorney

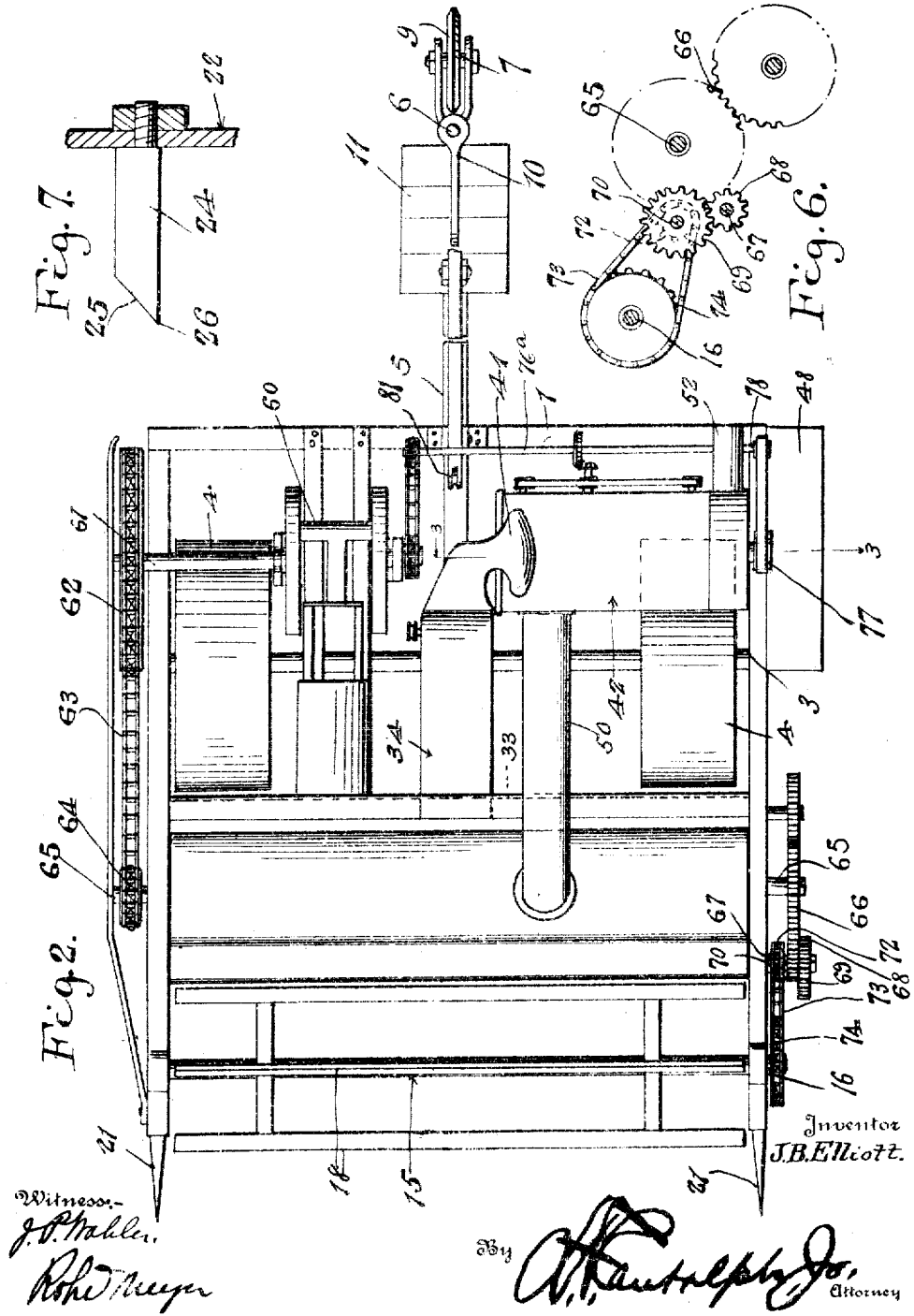

J. B. ELLIOTT.
THRESHING MACHINE.
APPLICATION FILED JULY 29, 1916.
1,262,760.
Patented Apr. 16, 1918.
3 SHEETS—SHEET 3.
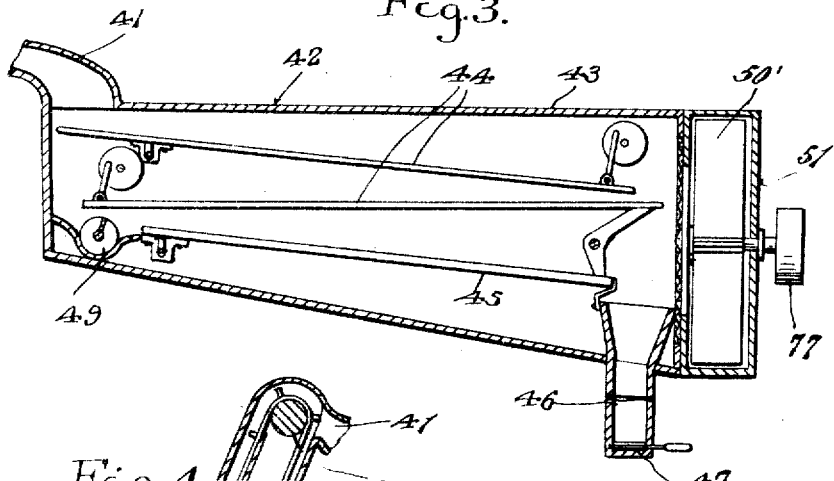
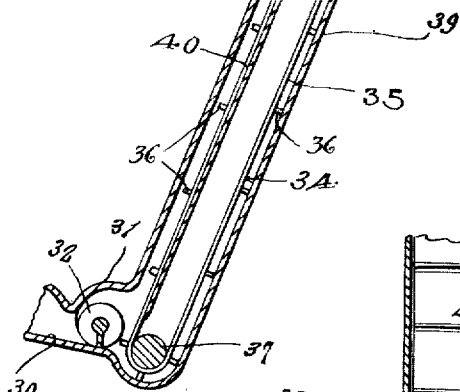
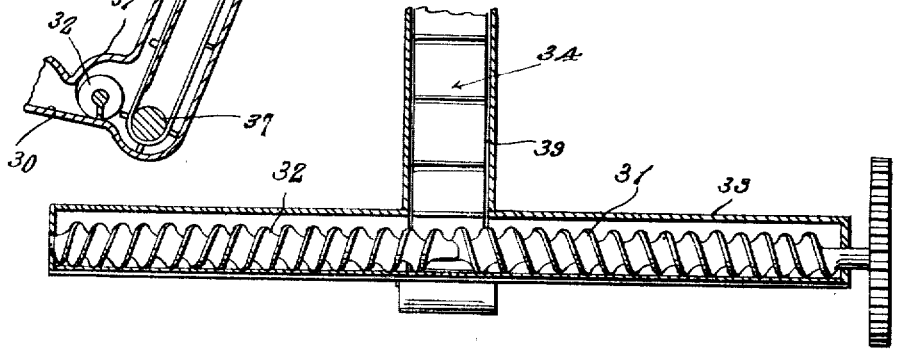
Inventor
J. B. Elliott.

UNITED STATES PATENT OFFICE.

JOHN B. ELLIOTT, OF WICHITA, KANSAS.

THRESHING-MACHINE.

1,262,760.  Specification of Letters Patent.  Patented Apr. 16, 1918.

Application filed July 29, 1916. Serial No. 112,127.

*To all whom it may concern:*

Be it known that I, JOHN B. ELLIOTT, a citizen of the United States, residing at Wichita, in the county of Sedgwick and State of Kansas, have invented certain new and useful Improvements in Threshing-Machines; and I do hereby declare the following to be a full, clear, and exact description of the invention, such as will enable others skilled in the art to which it appertains to make and use the same.

This invention relates to a machine for threshing wheat, rye, oats or analogous grain and the primary object of the invention is to provide a machine of this nature which may be driven over a field of growing grain, and which machine will gather in the heads of the grain, and thresh the kernels therefrom, leaving the straw standing upon the field thereby eliminating the necessity of cutting the grain, or heading the same by a separate machine.

Another object of this invention is to provide a threshing machine of this nature which includes a reel, a pair of feeding rollers, and an ordinary rotary cylinder and concave mechanism for beating and breaking up the heads of the grain for facilitating the extraction of the kernels therefrom, which reel is positioned for feeding the heads of the standing grain to the feeding rollers, which rollers in turn feed the heads of the grain to the rotary cylinder and concave structure.

Another object of this invention is to provide a structure including a plurality of vibratory grain pans, racks and sieves for efficiently separating the kernels from the chaff, of the grain heads, and to provide a conveyer structure for conveying the grain heads from the cylinder and concave structure to the plurality of vibratory grain pans, racks and sieves.

A further object of this invention is to provide a tailings conveyer for receiving the tailings from the separator structure and conveying them to the cylinder for repassage through the separator structure.

A still further object of this invention is to provide a blower fan for blowing the chaff rearwardly of the machine during the travel of the same.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Fig. 2 is a plan view of the machine.

Fig. 3 is a section through the separator structure.

Fig. 4 is a detail view showing in section the elevator for elevating the grain heads from the cylinder structure to the separator structure.

Fig. 5 is a detail in section showing the grain augers for carrying the grain to the elevator.

Fig. 6 is a detail view of the gearings employed for rotating the cylinder, reel and feed roller, and Fig. 7 is a detail view of a cylinder tooth used in the construction of this invention.

Figure 1:
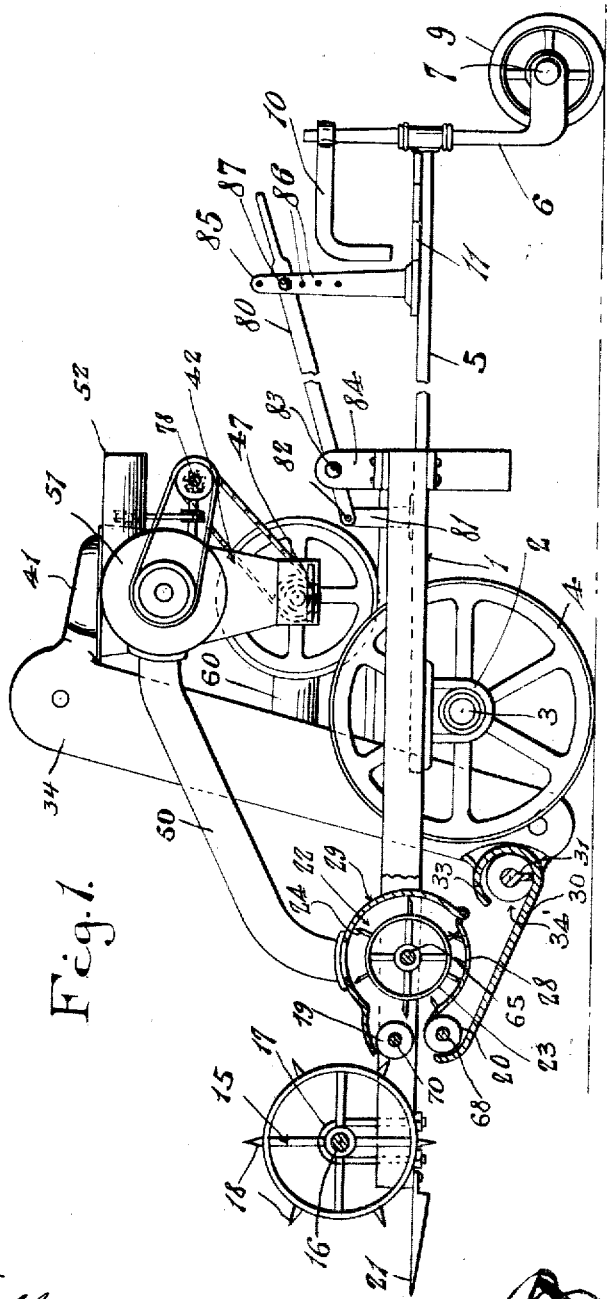
Figure 1 is a side elevation of the machine showing parts in vertical section.

Referring more particularly to the drawings, 1 designates the supporting frame of the harvester, which supporting frame is connected through the medium of U-shaped bolts 2, to the supporting axle 3 of the device upon which are mounted the usual type of supporting wheels 4. A frame 5 is provided which is rigidly connected to the supporting axle 3 in any suitable manner. The frame 5 projects rearwardly from the frame 1 and it has a standard 6 rotatably carried by its rear end. An axle 7 is rotatably supported by the lower end of the standard 6 and it has a supporting wheel 9 mounted thereon. A handle 10 is connected to the upper end of the standard 6 and is provided for rotating the standard for guiding the direction of travel of the wheel 9 for steering the direction of travel of the thresher. A suitable platform 11 is provided on which the operator of the device may stand.

A reel 15 which is mounted upon a shaft 16 is supported by a suitable supporting structure 17 at the front end of the frame 1, and the reel structure includes a plurality of blades 18 which, during the rotation of the reel are adapted for engaging the heads of the standing grain in a field, and guiding them inwardly between the feeding rollers 19 and 20. Suitable guiding arms 21 are attached to the forward corners of the supporting frame 1 and are provided for dividing the grain and guiding it inwardly to the reel structure 15.

The feeding rollers 19 and 20 are positioned one above the other, at the mouth of the cylinder and concave structure which is generically indicated by the numeral 22.

The cylinder and concave structure 22 includes a rotary cylinder 23 which has a plurality of circumferentially spaced cylinder teeth 24 carried by its outer surface and arranged in spaced rows, as is ordinary in the construction of threshing cylinders.

The cylinder teeth 24 are preferably rectangular in shape, and they have their outer ends cut at an incline as shown at 25, to provide relatively sharp cutting edges 26, which will sever the heads of the grain from the straw or stalks, during the rotation of the cylinder. The cylinder 23 rotates over a concave 28 of the ordinary construction, and the operation of the cylinder 23 and the concave 28 tend to break up the heads of the grain and facilitate in the threshing thereof. A housing 29 is positioned over the cylinder 23 for preventing the rotation of the cylinder from throwing the grain heads outwardly.

The grain falls from the concave 28 upon an inclined guiding board 30, which guides the grain from the cylinder structure 22 to a pair of auger conveyers 31 and 32. The auger conveyers 31 and 32 are positioned within housings 33, the forward sides of which are open as shown at 34' to permit the grain to pass off of the top of the board 30 into the casings or housings 33. The auger 31 leads from one side of the thresher to the center while the auger 32 leads from the opposite side of the thresher to the center so that these auger conveyers will feed the grain from the concave to the center of the machine, where it is engaged by an elevator structure 34. The elevator structure 34 includes an endless belt 35 which has a plurality of grain engaging flights 36 carried thereby, and which travel over suitable rollers 37 and 38, and within a housing 39. The upward traveling run of the endless belt 35 travels over a partition 40 which facilitates in carrying the grain upwardly for deposit through a spout 41 into the separator structure 42. The separator structure 42 includes a housing 43 in which is positioned the usual type of vibratory riddles, grain pans and screens as indicated at 44. The final riddle or screen indicated by the numeral 45 is positioned for delivering the grain kernels into a delivery spout 46 from which the grain is sacked. If it is so desired, a slidable door 47 may be carried by the spout 46 for controlling the outlet of the grain kernels out of the spout 46. A suitable platform 48 is provided for supporting sacks into which the grain is delivered by the spout 46. A tailings auger 49 is provided for receiving the tailings from the chaffer 44 and the tailings auger delivers the tailings to a chute 50 which returns the tailings to the cylinder structure, depositing them upon the cylinder through an opening in the top of the casing 29. A fan structure 50' is carried by the outer end of the housing 43 and the air suction into the fan comes through the casing 43, so that the chaff, fine particles of straw and the like will be drawn into the fan casing 51 and forced out of the same through a tube 52, which communicates with the interior of the fan casing and blows the chaff rearwardly of the machine.

A prime mover of any ordinary desired type, such as an internal combustion engine, which is indicated at 60 is carried by the supporting frame 1 and it propels a shaft 61 upon which a sprocket 62 is mounted. A sprocket chain 63 travels about the sprocket 62 and about a sprocket 64 which is mounted upon the shaft 65 which rotates the cylinder 23.

Mounted upon the end of the shaft 65, remote from the end upon which the sprocket 64 is mounted is a gear 66 which meshes with a gear 67 mounted upon the shaft 68, upon which the feeding roller 20 is mounted. The gear 67 preferably has a long face, and a gear 69, which is mounted upon the shaft 70 meshes with the gear 67. The roller 19 is mounted upon the shaft 70 and through the medium of the gears 69 and 67, it will be rotated in a direction oppositely to the rotation of the feeding roller 20, so that the two rollers will rotate for feeding the grain heads inwardly into the cylinder casing 29. A sprocket 72 is mounted upon the shaft 70 and it is connected through the medium of a sprocket chain 33 and a sprocket 74 to the shaft 16 upon which the reel structure 15 is mounted.

The various riddles and sieves 44 and 45, and the tailings auger 49 may be operated in any suitable manner by the prime mover or engine 60, as indicated in Fig. 2 of the drawings through the medium of a shaft 76ª while the fan 50' is rotated through the medium of a pulley 77 which is operatively connected to a pulley 78 mounted upon the shaft 76ª.

The frame 1 is rocked, upon the axle 3 as a support, for raising or lowering the front end of the machine to accommodate different heights of grain, by a hand lever 80 which is pivotally supported by a standard 81 as shown at 82. The standard 81 is carried by the frame 5. The lever 80 is connected as shown at 83 to a standard 84 which is in turn connected to the frame 1. A standard 85 is carried by the frame 5, and it has a plurality of openings 86 formed therein through which a pin 87 extends for engagement with the lever 80 for holding it in various adjusted positions.

In the operation of the improved grain thresher; the device is propelled over a field of standing grain, such as wheat, oats, rye or the like by any suitable means, such as a tractor and it is pushed forwardly of the tractor, so that the heads of the grain will be engaged by the reel 15, which will guide them between the feeding rollers 19 and 20. The feeding rollers 19 and 20 will feed the heads of the standing grain into the casing 29, where the rotary cylinder 23 will sever the heads from the straw or stalks of the grain, leaving the straw standing, and threshing and beating out the heads of the grain, by its rotation and combination with a concave 28. The beaten heads of grain, fall from the concaves 28 upon the guiding board 30, which guides them downwardly to the auger conveyers 31 and 32. The auger conveyers 31 and 32 carry the grain to the elevation structure 34 which elevates the grain and deposits it in the separator structure 43, wherein the kernels of the grain are efficiently separated from the chaff. The chaff is blown out of the casing 43 of the separator structure by the operation of the fan 50, while the kernels of the grain fall downwardly through the delivery spout 46 and into suitable sacks or receptacles which may be carried by the platform 48. The tailings from the separator structure 42 are returned to the cylinder structure by the tailings auger 49 and the chute 50 and they are reseparated.

From the foregoing description taken in connection with the accompanying drawings the advantages of construction and of the method of operation of the improved threshing machine will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a grain thresher, the combination of grain threshing means including a rotary thresher cylinder, a concave positioned beneath said cylinder, a housing inclosing said cylinder, a grain guiding board positioned beneath said concave, the forward edges of said housing and grain guiding board forming a mouth through which grain heads pass to said cylinder and concave, a pair of rollers positioned at said mouth for guiding grain heads between said cylinder and concave, and means for guiding the heads of standing grain to said rollers.

In testimony whereof I affix my signature in presence of two witnesses.

JOHN B. ELLIOTT.

Witnesses:
D. WM. WOOLLEY,
HARRY S. WILBUR.